No. 707,997. Patented Aug. 26, 1902.
A. WICKSTROM.
NUT CRACKER.
(Application filed Dec. 17, 1901.)
(No Model.)

WITNESSES: INVENTOR.
August Wickstrom
BY
ATTORNEY.

THE NORRIS PETERS CO., PHOTO-LITHO., WASHINGTON, D. C.

UNITED STATES PATENT OFFICE.

AUGUST WICKSTROM, OF DENVER, COLORADO.

NUT-CRACKER.

SPECIFICATION forming part of Letters Patent No. 707,997, dated August 26, 1902.

Application filed December 17, 1901. Serial No. 86,252. (No model.)

*To all whom it may concern:*

Be it known that I, AUGUST WICKSTROM, a citizen of the United States of America, residing at Denver, in the county of Arapahoe and State of Colorado, have invented certain new and useful Improvements in Nut-Crackers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in nut-crackers, my object being to provide a device of this class which shall be simple in construction, economical in cost, reliable, durable, and efficient in use; and to these ends the invention consists of the features, arrangements, and combinations hereinafter described and claimed, all of which will be fully understood by reference to the accompanying drawings, in which is illustrated an embodiment thereof.

Figure 1:
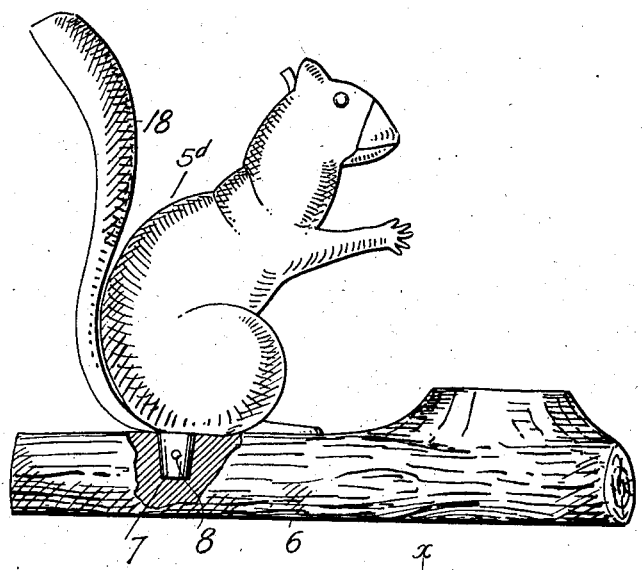
Figure 2:
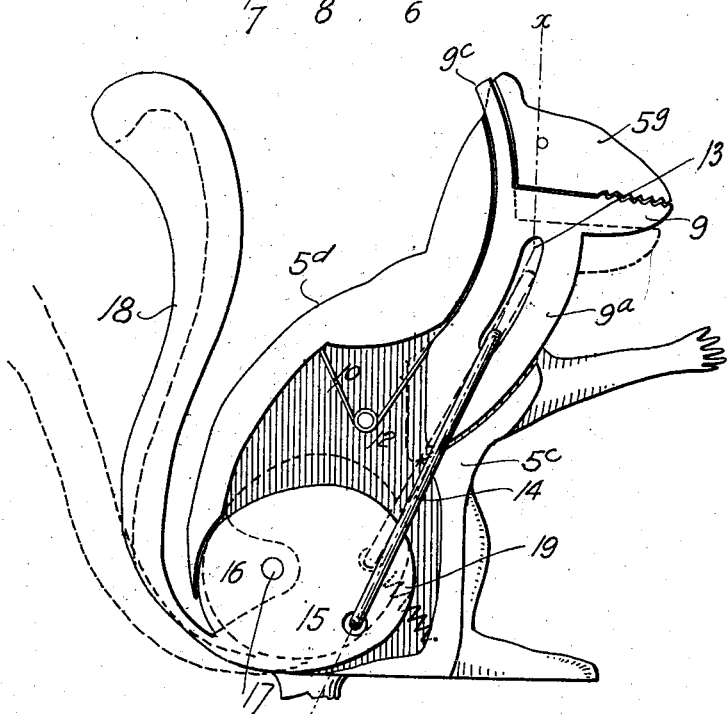
Figure 3:
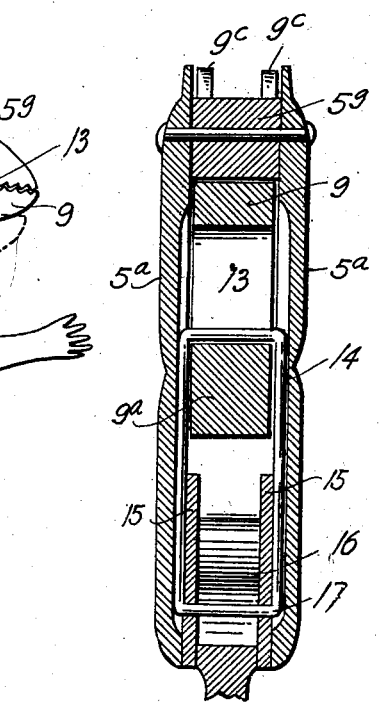

In the drawings, Figure 1 is a side elevation of my improved nut-cracker. Fig. 2 is a similar view with one side of the casing removed. Fig. 3 is a section taken on the line $x\ x$, Fig. 2.

The same reference characters indicate the same parts in all the views.

Let the numeral 5 designate a casing which, as shown in the drawings, consists of two side pieces $5^a$ and front and rear parts $5^c$ and $5^d$, respectively. This casing is suitably mounted on a base 6. As shown in the drawings, a tenon 7, formed integral with the casing, projects downwardly into a mortise formed in the base and is provided with an opening through which is passed a horizontal pin $7^a$, which engages a registering opening in the base. The upper part $5^g$ of the casing consists of a stationary jaw 8, which coöperates with a movable jaw 9. The last-named jaw extends downwardly, as shown at $9^a$, into a chamber inclosed by the casing. This jaw 9 is normally held in the closed position by a weak spring 10, which, as shown in the drawings, is coiled around a loose pin 12, one extremity of which is connected with the rear part of the casing, while the opposite extremity is attached to the lower extremity of the said jaw. This jaw is also provided with upward projections $9^c$, which protrude from the casing and when pressed move the jaw 9 downwardly to the dotted-line position in Fig. 2, leaving sufficient space between the jaws for the insertion of the nut to be cracked. The part $9^a$ of the movable jaw is provided with an elongated opening 13, in which is inserted the upper extremity of a connecting-rod 14, whose opposite extremity is connected with an eccentric cam 15, which is pivoted on a projection 16 of the casing, as shown at 17. As shown in the drawings, the eccentric is composed of two parts having a space between them into which the part 16 projects, and the connecting-rod is rectangular in shape, its upper extremity passing through the slot 13 of the jaw 9 and engaging the jaw to force the same toward the closed position with sufficient force to crack the nut when the eccentric is actuated. The eccentric is operated by a lever-arm 18, which may be connected therewith in any suitable manner. As shown in the drawings, the lever-arm is cast integral with the eccentric. This lever-arm is normally held at its upper limit of movement by a coil-spring 19, connected with the eccentric at one extremity and with the lower part of the casing at the opposite extremity. The length of the slot 13 is such that the jaw 9 may be moved downwardly against the spring 10 sufficiently to leave a space between the jaws of suitable width for the insertion of a nut before the jaw at the upper end of the slot comes in contact with the connecting-rod or the device for actuating the movable jaw.

As shown in the drawings, my improved device is designed or constructed in the shape of a squirrel, the tail being the lever-arm connected with the eccentric or cam.

From the foregoing description the operation of my improved device will be readily understood. By pressing downwardly on either of the projections $9^c$ the jaw 9 is lowered or opened and a nut inserted between the two jaws. The lever-arm 18 is then moved downwardly to the dotted-line position in Fig. 2, actuating the eccentric to throw the connecting-rod 14 against the jaw 9 with sufficient force to crack the nut.

Having thus described my invention, what I claim is—

1. In a nut-cracker, the combination with a suitable casing, of a stationary jaw, a movable jaw having a projection protruding through the casing to permit the opening of the jaw by pressure thereon, an eccentric pivoted in the casing, a lever-arm connected with the eccentric, and a rod connecting the movable jaw with the eccentric.

2. The combination with a casing, of a stationary jaw, a coöperating movable jaw, a spring normally holding the movable jaw in the closed position, the movable jaw being provided with an elongated opening, a connecting-rod having one extremity located in said opening, an eccentric to which the opposite extremity of the rod is connected, and a lever-arm for actuating the eccentric.

3. In a nut-cracker, the combination with a casing, of a stationary jaw, a movable jaw coöperating with the stationary jaw, a spring for holding the movable jaw in the closed position, the movable jaw having a projection protruding through the casing to permit the opening of the jaw by pressure thereon, the jaw being provided with an elongated opening, a rod having one extremity engaging said opening, and suitable means connected with the opposite extremity of the rod for actuating the movable jaw for the purpose set forth.

4. In a nut-cracker, the combination with a suitable casing, of a stationary jaw, a movable jaw coöperating with the stationary jaw, the movable jaw having a projection protruding through the casing to permit the opening of the jaw by pressure thereon, a weak spring normally holding the movable jaw in the closed position, an eccentric mounted in the casing, a rod connecting the eccentric with the movable jaw, and a lever-arm for actuating the eccentric.

In testimony whereof I affix my signature in presence of two witnesses.

AUGUST WICKSTROM.

Witnesses:
DENA NELSON,
A. J. O'BRIEN.